(12) United States Patent
Sasaki (10) Patent No.: US 9,815,249 B2
(45) Date of Patent: Nov. 14, 2017

(54) METHOD FOR PRODUCING TIRE VULCANIZING MOLD AND TIRE VULCANIZING MOLD

(71) Applicant: BRIDGESTONE CORPORATION, Tokyo (JP)

(72) Inventor: Sachio Sasaki, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 14/770,263

(22) PCT Filed: Feb. 25, 2014

(86) PCT No.: PCT/JP2014/054521
§ 371 (c)(1),
(2) Date: Aug. 25, 2015

(87) PCT Pub. No.: WO2014/129651
PCT Pub. Date: Aug. 28, 2014

(65) Prior Publication Data
US 2016/0016371 A1  Jan. 21, 2016

(30) Foreign Application Priority Data
Feb. 25, 2013 (JP) ................................. 2013-034747

(51) Int. Cl.
*B29D 30/06* (2006.01)
*B23P 15/24* (2006.01)
(Continued)

(52) U.S. Cl.
CPC ........ *B29D 30/0606* (2013.01); *B22F 3/1055* (2013.01); *B23P 15/246* (2013.01);
(Continued)

(58) Field of Classification Search
CPC .................... B29D 30/0606; B29D 2030/0609
See application file for complete search history.

(56) References Cited

U.S. PATENT DOCUMENTS

| 1,969,083 A | * | 8/1934 | Lawson | ................. B29D 23/24 |
| | | | | 425/28.1 |
| 3,082,480 A | * | 3/1963 | Balle | .................. B29D 30/0629 |
| | | | | 425/46 |

(Continued)

FOREIGN PATENT DOCUMENTS

| CN | 102256778 A | 11/2011 |
| CN | 102294773 A | 12/2011 |

(Continued)

OTHER PUBLICATIONS

Jun. 3, 2016 Office Action issued in Chinese Patent Application No. 201480022722.5.

(Continued)

*Primary Examiner* — James Mackey
(74) *Attorney, Agent, or Firm* — Oliff PLC (57) ABSTRACT

To provide a method for producing a tire vulcanizing mold capable of obtaining a tire vulcanizing mold having excellent durability and high precision at low cost and to provide such a tire vulcanizing mold, the method includes producing a tire vulcanizing mold by assembling a pattern molding segment, produced by rapid prototyping, on a metal base segment, the method further includes a step of producing the pattern molding segment from a metal based on a shape of a surface layer part including a pattern shaping surface in a basic model of the tire vulcanizing mold.

10 Claims, 6 Drawing Sheets

(51) Int. Cl.
*B22F 3/105* (2006.01)
*B33Y 10/00* (2015.01)
*B33Y 80/00* (2015.01)

(52) U.S. Cl.
CPC ...... *B29D 30/0629* (2013.01); *B29K 2905/02* (2013.01); *B33Y 10/00* (2014.12); *B33Y 80/00* (2014.12)

(56) References Cited

U.S. PATENT DOCUMENTS

| | | | | | |
|---|---|---|---|---|---|
| 3,479,693 | A | * | 11/1969 | Cantarutti | B29D 30/0629 425/40 |
| 3,901,632 | A | * | 8/1975 | Prosdocimi | B29D 30/0629 425/39 |
| 4,553,918 | A | * | 11/1985 | Yoda | B29D 30/0606 425/46 |
| 4,576,559 | A | * | 3/1986 | Yoda | B29C 33/10 249/141 |
| 5,190,767 | A | * | 3/1993 | Beres | B29D 30/0629 425/28.1 |
| 5,290,163 | A | * | 3/1994 | Katsumata | B29D 30/0629 425/183 |
| 5,340,294 | A | * | 8/1994 | Kata | B29C 33/10 264/219 |
| 5,494,551 | A | * | 2/1996 | Stevens | B29C 33/20 156/394.1 |
| 5,589,200 | A | * | 12/1996 | Irie | B29C 33/202 425/46 |
| 5,980,810 | A | * | 11/1999 | Ladouce | B29D 30/0629 264/326 |
| 6,382,943 | B1 | * | 5/2002 | Metz | B29D 30/0606 29/428 |
| 7,402,031 | B2 | * | 7/2008 | Hyakutake | B22C 9/02 425/28.1 |
| 2006/0134250 | A1 | * | 6/2006 | Henrotte | B29C 33/10 425/35 |
| 2006/0257511 | A1 | * | 11/2006 | Iwamoto | B22F 5/007 425/35 |
| 2007/0187117 | A1 | | 8/2007 | Tanaka et al. | |
| 2008/0299240 | A1 | * | 12/2008 | Hyodo | B29D 30/0629 425/36 |
| 2011/0254185 | A1 | * | 10/2011 | Liew | B29C 33/303 264/40.5 |
| 2011/0318532 | A1 | | 12/2011 | Dusseaux et al. | |
| 2012/0161348 | A1 | * | 6/2012 | Jenkins | B29D 30/0606 264/36.14 |

FOREIGN PATENT DOCUMENTS

| | | | |
|---|---|---|---|
| DE | 1200518 B | | 9/1965 |
| DE | 10 2007 005 455 | * | 8/2008 |
| DE | 102010037785 A1 | | 3/2012 |
| EP | 1541323 A1 | | 6/2005 |
| EP | 1652644 A1 | | 5/2006 |
| FR | 1522640 | * | 4/1967 |
| JP | S63-49407 A | | 3/1988 |
| JP | 2003-320595 A | | 11/2003 |
| JP | 2006-44072 | * | 2/2006 |
| JP | 2006-256240 A | | 9/2006 |
| JP | 2012-512069 A | | 5/2012 |
| WO | 2004/048062 A1 | | 6/2004 |
| WO | 2005/082591 A1 | | 9/2005 |

OTHER PUBLICATIONS

Feb. 12, 2016 Search Report issued in European Patent Application No. 14754867.1.

Apr. 8, 2014 International Search Report issued in International Patent Application No. PCT/JP2014/054521.

Dec. 6, 2016 Office Action issued in European Patent Application No. 14754867.1.

Jan. 22, 2017 Office Action issued in Chinese Patent Application No. 201480022722.5.

* cited by examiner

AXIAL DIRECTION

FIG. 10B

RADIAL DIRECTION

FIG. 11

METHOD FOR PRODUCING TIRE VULCANIZING MOLD AND TIRE VULCANIZING MOLD

TECHNICAL FIELD

The present invention relates to a method for producing a tire vulcanizing mold and, in particular, a method for producing a high-precision tire vulcanizing mold at low cost and by fewer operational processes.

BACKGROUND

It is known that, in a tire vulcanizing apparatus, an unvulcanized tire (green tire) is enclosed by side molds surrounding the side regions of the unvulcanized tire and a plurality of sector molds surrounding the crown region of the unvulcanized tire, and pressure is applied to the mold interior from outside while a heating medium is supplied to thereby promote the vulcanizing.

Also, known as the methods for producing these molds are primarily die-casting and in recent years rapid prototyping.

Of these methods, die-casting comprises a number of processes including the fabrication of a prototype model and a rubber mold, the fabrication of a mold, and the casting, using a number of intermediate materials. In comparison with this, rapid prototyping has an edge over the die-casting in being able to produce a metal mold based on a 3D model of the metal mold in a short period of time. However, it has a problem of greater likelihood of deformation by thermal strain due to its specificity that each layer is produced by repeating heating and sintering and stacked together. Also, the rapid prototyping is disadvantageous compared to the die-casting in that the cost rises dramatically with the volume of the mold to be produced.

Also, disclosed in Patent Document 1 in particular is a method for producing a sector mold in a short time and at low cost, in which a pattern molding segment made of a thermoplastic resin molded by rapid prototyping is heated, pressurized and assembled on a base segment of an aluminum alloy to produce the sector mold. According to this producing method, however, because the pattern molding segment is made of a resin, the pattern molding segment is easy to wear and deform by the repeated use of the vulcanizing apparatus and thus it is concerned that the durability would be inferior.

RELATED ART DOCUMENT

Patent Document

Patent Document 1: Japanese Unexamined Patent Application Publication No. 2006-256240
Patent Document 2: International Publication WO2004/048062

SUMMARY OF THE INVENTION

Problems to be Solved by the Invention

To solve the above-described problems, an object of the present invention is to provide a method for producing a tire vulcanizing mold capable of obtaining a tire vulcanizing mold having excellent durability, low cost, and high precision and to provide a tire vulcanizing mold.

Means for Solving the Problem

As a method for producing a tire vulcanizing mold to solve the above-described problems, there is provided a method for producing a tire vulcanizing mold by assembling a pattern molding segment produced by rapid prototyping on a metal base segment, the method including a step of producing a pattern molding segment from a metal based on a shape of a surface layer part including a pattern shaping surface in a basic model of the tire vulcanizing mold.

It is to be understood that the foregoing summary of the invention does not necessarily recite all the features essential to the invention, and subcombinations of all these features are intended to be included in the invention.

MODE FOR CARRYING OUT THE INVENTION

The invention will now be described based on embodiments which do not intend to limit the scope of the claims of the present invention but exemplify the invention. All of the combinations of the features described in the embodiments are not necessarily essential to the solving means of the invention.

Figure 1:
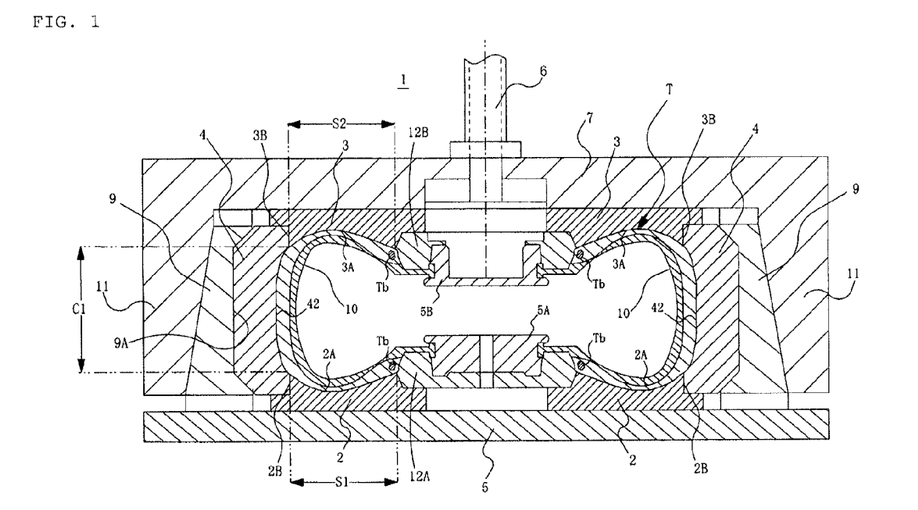
FIG. 1 is a cross-sectional view showing a vulcanizing apparatus.

FIG. 1 is a vertical cross-sectional view of a vulcanizing apparatus 1. As shown in this sectional view, the vulcanizing apparatus 1 includes a lower-side mold 2, which shapes a side region S1 below of a green tire T before vulcanizing (hereinafter referred to simply as a tire) placed horizontally in the apparatus with the rotation axis of tire extending vertically, an upper-side mold 3, which is located opposite to the lower-side mold 2 and shapes a side region S2 above of the tire T, and a plurality of sector molds 4, which are disposed along a circumferential direction of the tire T between the lower-side mold 2 and the upper-side mold 3 vertically opposite to each other and shape a predetermined pattern (tread pattern) on a circumferential surface of a crown region C1 of the tire T.

The tire T is, for example, an unvulcanized tire shaped on a not-shown tire building drum. The tire T includes components such as a not-shown carcass toroidally extending astride a pair of beads Tb, Tb vertically spaced apart from each other in the illustration, a plurality of belts stacked on the carcass in the crown region C1, and a tread rubber.

The lower-side mold 2 is a disk-like mold with an opening in the midsection thereof. With the tire T placed thereon, a shaping surface 2A comes in contact with the side region S1 extending from the vicinity of the lower-positioned bead Tb, Tb toward the crown region C1, thereby shaping the side region S1. Also, the lower-side mold 2 is disposed on a base 5, which has a heat insulating function.

The upper-side mold 3, in the same way as the lower-side mold 2, is a disk-like mold with an opening in the midsection thereof. With the tire T placed thereunder, the shaping surface 3A comes in contact with the side region S2 extending from the vicinity of the upper-positioned bead Tb, Tb toward the crown region C1, thereby shaping the side region S2. Also, the upper-side mold 3 is disposed on the underside of an outer ring 7 having a heat insulating function, which can be moved up and down along with the rising and lowering movement of a center post 6. At the end of a vulcanizing process, the tire T is removed from the mold by raising the center post 6 and thereby separating the upper-side mold 3 joined with the outer ring 7 upward from the lower-side mold 2.

A plurality of sector molds 4 are mold segments that surround the crown region C1 of the tire T in a ring form along the circumferential direction of the crown region C1 when they are combined with each other in engagement with the lower-side mold 2 and the upper-side mold 3. The sector mold 4 is, for instance, divided into 8 segments along the circumferential direction of the tire T. Also, a pattern shaping surface 42 of the sector mold 4 coming in contact with the outer periphery of the crown region C1 has an uneven surface for shaping a predetermined tread pattern on the circumferential surface of the crown region C1. This allows the shaping of a tread pattern with inverted unevenness on the circumferential surface of the crown region C1.

The plurality of sector molds 4 surrounding the crown region C1 of the tire T along the circumferential direction are held by a plurality of segments 9 having a heat insulating function and disposed in a radially expandable and contractible manner along a slider mechanism disposed on the base 5. At the completion of the vulcanizing process, the tire T is removed from the mold by canceling the hold by the arm portion 11 of the outer ring 7 holding the outer periphery of the segments 9 by raising the center post 6 and thereby allowing the segments 9 to expand radially.

Inside the vulcanizing apparatus 1, a bladder 10 is placed on the inner periphery of the tire T which is surrounded by the plurality of molds. The bladder 10 is an expandable receptacle which can be expanded by a pressurized and heated gas supplied from outside the vulcanizing apparatus 1. When expanded, the bladder 10 comes into close contact with the inner periphery of the tire T and presses the outer periphery of the tire T against the above-described lower-side mold 2, the upper-side mold 3, and the sector mold 4.

The lower-side mold 2, the upper-side mold 3, and the bladder 10 are sealed by a bead ring 5A and a clamp ring 12A disposed on the lower-side mold 2 side and a bead ring 5B and a clamp ring 12B disposed on the upper-side mold 3 side. With the bladder 10 expanded, the vulcanizing of the tire T progresses under a sealed condition.

Figure 2:
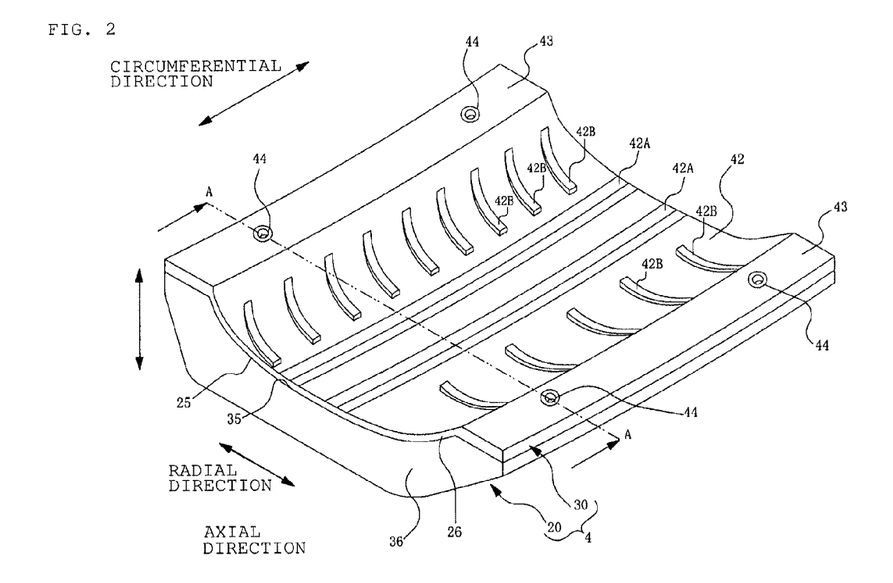
FIG. 2 is an overall perspective view showing a sector mold.
Figure 4:
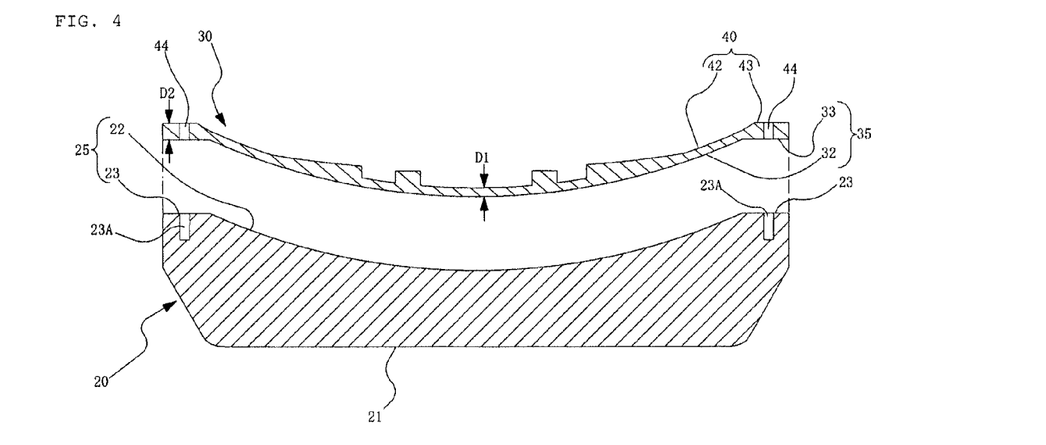
FIG. 4 is a cross-sectional view (taken along line A-A in FIG. 2) of the sector mold.

FIG. 2 is a perspective view showing a single sector mold 4 out of a plurality of sector molds 4, which are part of a main construction of the present embodiment. Also, FIG. 4 is a cross-sectional view taken along a width direction of the sector mold. It is to be noted that in FIG. 4, the width direction, the circumferential direction, and the radial direction are the directions with reference to the tire T placed in the vulcanizing apparatus 1 shown in FIG. 1.

As shown in FIG. 2, a sector mold 4 according to the present embodiment is constituted by a base mold 20 as a base segment and a pattern mold 30 as a pattern molding segment which is detachably assembled on the base mold 20.

The base mold 20 is made of a metal, such as aluminum, produced by casting, machining, or both based on a basic model, such as 3D CAD data, of a sector mold 4 to be discussed later. And the pattern mold 30 is made of a metal, such as aluminum, produced by rapid prototyping based on a similar basic model as described above.

It should be noted that the metal constituting the base mold 20 and the pattern mold 30 is not limited to aluminum. Also, it is not necessary that the base mold 20 and the pattern mold 30 are made of the same metal, but they may be made of different metals or alloys as long as their thermal expansion rates are the same or close to each other. Hereinbelow, a description is given of the specific shapes and producing processes of the base mold 20 and the pattern mold 30.

Figure 3:
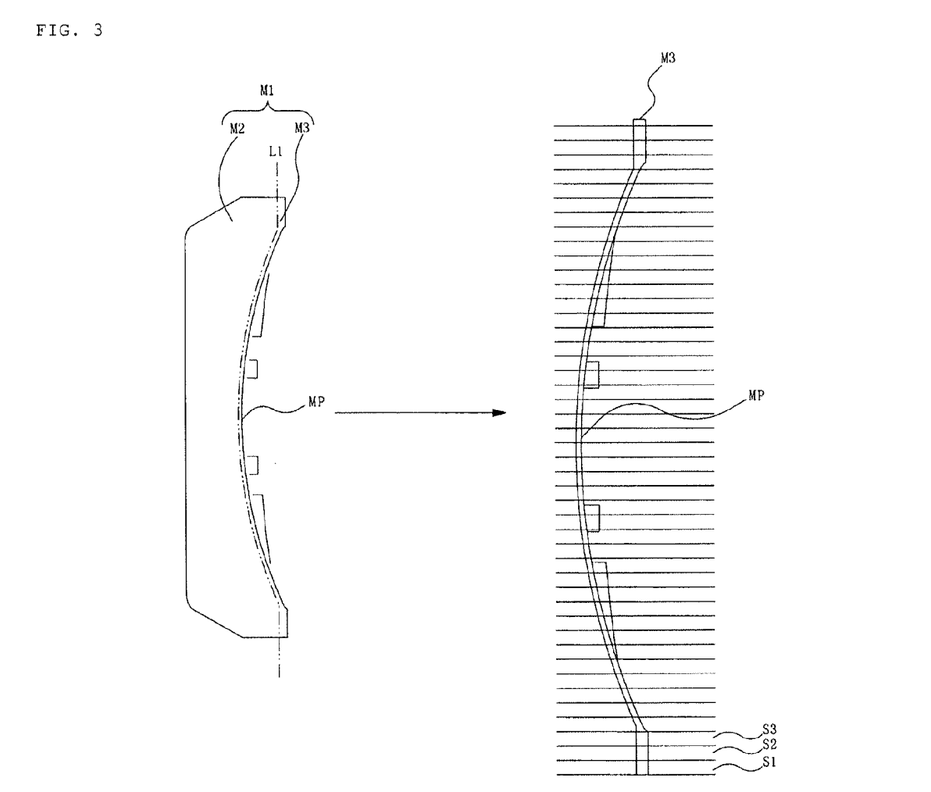
FIG. 3 is a schematic representation showing a basic model for a mold and a model after division.

FIG. 3 is a schematic representation showing a mold model M1 configured of 3D CAD data or the like. The mold model M1 is basic design data for design in agreement with the total shape of the sector molds 4 after assembly. In the conventional mold producing process, the whole of the sector mold 4 is cast, machined, or produced by rapid prototyping based on the shape of the mold model M1.

On the other hand, in the producing method of the sector mold 4 according to the present embodiment, the mold model M1 is divided into a plurality of regions by a virtual division line L1. And the base mold 20 and the pattern mold 30 are respectively produced based on the shapes of the plurality of divided regions.

As shown in FIG. 3, the virtual division line L1 is an optional virtual line extending along the width direction such that it divides and separates the mold model M1 in the radial direction.

The radially outer region with respect to the virtual division line L1 is referred to as the base-side mold model M2 that defines the shape of the base mold 20. And the radially inner region with respect to the virtual division line L1 is referred to as the pattern-side mold model M3 that defines the shape of the pattern mold 30.

Also, the virtual division line L1 defines the shapes of the joint portion 25 of the base mold 20 and the joint portion 35 of the pattern mold 30, to be discussed later, that are joined with each other.

As is evident from FIG. 3, the pattern-side mold model M3 defining the shape of the pattern mold 30 is in correspondence to the shape of the surface layer part including the pattern shaping surface MP of the basic mold model M1 and has a radially thinner thickness in contrast to the base-side mold model M2.

Also, the base-side mold model M2 defining the shape of the base mold 20 is in correspondence to the shape of the basic mold model M1 with the shape of the pattern-side mold model M3 removed.

Hereinbelow, a description will be given of the shapes of the base-side mold model M2 and the pattern-side mold model M3 and the specific shapes of the base mold 20 and the pattern mold 30 corresponding thereto, respectively.

The base mold 20 is precisely produced by casting, machining, or both and through a surface grinding process or the like in accordance with the base-side mold model M2 divided along the virtual division line L1.

As shown in FIG. 1 and FIG. 4, the base mold 20 has an outer periphery 21 facing the inner periphery 9A of the segment 9 and a joint portion 25 facing the base mold 30. The segment 9 and the base mold 30 shown in FIG. 1 are detachably joined with each other by way of a not-shown joining means. The outer periphery 21 of the base mold 20 is a surface in close contact with the inner periphery 9A of the segment 9 when the base mold 20 is joined with the segment 9.

As shown in FIG. 4, the joint portion 25 formed on the side opposite from the outer periphery 21 has a surface shape defined by the virtual division line L1 which is brought face to face into close contact with the joint portion 35 of the pattern mold 30. The joint portion 25 has a pattern-side joint surface 22 and end-side joint surfaces 23, 23 extending outwardly from the both width ends in the width direction of the pattern-side joint surface 22.

The pattern-side joint surface 22 is a surface curved at predetermined curvatures along the width direction and the circumferential direction. When assembled on the pattern mold 30, the pattern-side joint surface 22 comes in close contact with the pattern-side joint surface 32 constituting the joint portion 35 of the pattern mold 30 curved at the predetermined curvatures. The end-side joint surfaces 23, 23 are each bent in the width direction outwardly from the pattern-side joint surface 22 and curved in the circumferential direction at an approximately the same curvature as that of the pattern-side joint surface 22. When assembled on the pattern mold 30, the end-side joint surfaces 23, 23 come in close contact with the end-side joint surfaces 33, 33 constituting the joint portion 35 of the pattern mold 30 curved at the predetermined curvatures. Also, the end-side joint surfaces 23, 23 have a plurality of bolt holes 23A opened spaced apart from each other in the circumferential direction.

The joint portion 25 of the base mold 20 configured as described above is formed precisely in agreement with the shape of the base-side mold model M2, that is, the above-described virtual division line L1, thus constituting a reference surface in assembling the pattern mold 30 thereon.

In other words, the pattern mold 30, which is produced with a thin thickness in accordance with the pattern-side mold model M3 by rapid prototyping, is placed on the joint portion 25 serving as the reference surface. Then the pattern mold 30 is joined as being pressed against the joint portion 25 by not-shown bolts. Thus, deformation of the pattern mold 30 due to thermal strain, if any, can be corrected by spreading the deformation in the width direction and the circumferential direction.

The pattern mold 30 is produced by rapid prototyping in accordance with the pattern-side mold model M3 having been divided along the virtual division line L1. The rapid prototyping here is a molding method capable of quickly forming a shape corresponding to a solid model (the pattern-side mold model M3 in the present embodiment) consisting of 3D CAD data or the like. More specifically, slice data (layered data) of a plurality of divided layers is generated from the solid model, and the slice data is transmitted to a molding machine. The molding machine having received a plurality of slice data irradiates a laser to material powder placed in layers beforehand and forms layers corresponding to the shapes of the respective slice data by applying heat and sintering the material powder. Also, the heating and sintering are repeated in correspondence to the number of slice data. And the layers formed by heating and sintering are stacked one by one in a predetermined direction into a unified body.

In fabricating the pattern mold 30 by the above-described rapid prototyping, slice data S1, S2, S3, . . . are generated by dividing the pattern-side mold model M3, a division of mold model M1, in the width direction, for instance, as shown in FIG. 2. Then the layers are sintered in accordance with the slice data S1, S2, S3, . . . , and the layers are stacked in the width direction. It is to be noted that in the present embodiment, by setting the stacking direction of the layers to be the width direction, stacking level differences occurring on the pattern shaping surface 42, to be discussed later, in correspondence to the pattern shaping surface MP are minimized and the minute recesses and protrusions occurring on the pattern shaping surface 42 are reduced, whereby the precision of the circumferential surface of the crown region C1 of the tire T is improved.

It should be noted that the stacking in the circumferential direction also improves the precision of the circumferential surface of the crown region C1 for the same reason in contrast to the stacking in the radial direction.

Hereinbelow, a description is given of the stacking level differences by referring to FIG. 10.

Figure 10A:
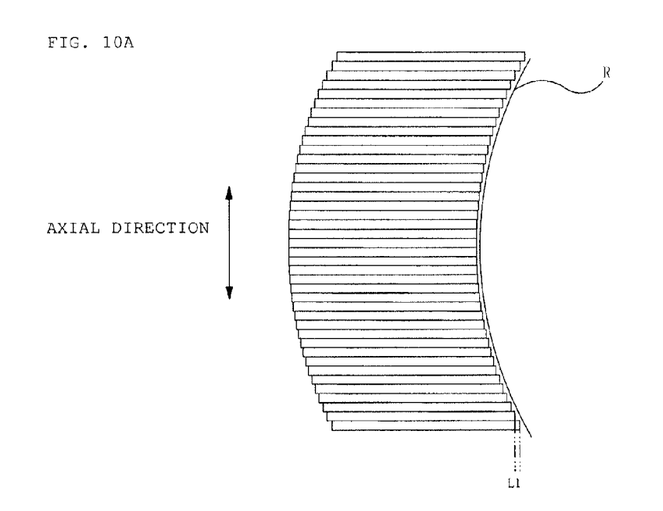
FIGS. 10A and 10B are schematic illustrations exaggerating stacking level differences.
Figure 10B:
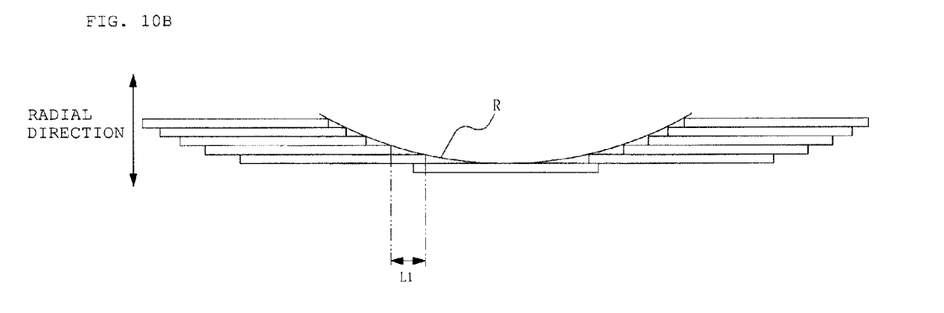

FIG. 10A and FIG. 10B are schematic illustrations exaggerating stacking level differences when the stacking direction is the width direction and when the stacking direction is the radial direction, respectively. Also, the arc R illustrated in each figure represents a locally viewed shape of the pattern shaping surface 42 curved along the width direction. As is clear from the figures, when the thickness of each layer in the stacking direction is assumed to be the same, the distance of the level difference L1 occurring between the layers is shorter in FIG. 10A where the angle of inclination of the arc R as a whole is steep than in FIG. 10B where the angle of inclination of the arc R as a whole is gentle.

In other words, when producing the pattern mold 30 by rapid prototyping, by producing in a state in which the stacking direction is held in agreement with the width direction, that is, the width direction of the pattern mold 30 is held upright in agreement with the vertical direction, it is possible to reduce the stacking level differences of the pattern shaping surface 42, and a highly precise pattern mold 30 with reduced unevenness of the pattern shaping surface 42 can be obtained.

Also, the stacking direction being the width direction can reduce the occupancy inside the molding apparatus when compared with the stacking direction being the radial direction or the circumferential direction. This makes it possible to fabricate a plurality of pattern molds 30 in a single shaping process, thus improving the productivity.

Also, the stacking direction being the circumferential direction improves the productivity for the same reason when compared with the stacking direction being the radial direction.

It is to be noted that the stacking direction can be selected as appropriate in consideration of the dimensional ratios and the curvature in the width or the circumferential direction of the pattern mold 30. Thus it is possible to freely adjust the precision and production efficiency by arbitrarily selecting the stacking direction.

As shown in FIG. 4, the pattern mold 30 produced by rapid prototyping has a joint portion 35 opposite to the joint portion 25 of the base mold 20 and a tire pattern shaping portion 40 coming in contact with the crown region C1 of the tire T at the time of vulcanizing. The joint portion 35 has a surface shape nearly in agreement with the above-described virtual division line L1 and comes into close contact in a face-to-face manner with the joint portion 25 of the base mold 20.

Also, as described earlier, the joint portion 35 has a pattern-side joint surface 32 and end-side joint surfaces 33, 33 in correspondence to the pattern-side joint surface 22 and the end-side joint surfaces 23, 23 of the base old 20, respectively.

The pattern-side joint surface 32 is a surface curved at predetermined curvatures in the width direction and the circumferential direction. Also, the end-side joint surfaces 33, 33 are each bent outwardly in the width direction from the pattern-side joint surface 32 and curved circumferentially at approximately the same curvature as that of the pattern-side joint surface 32.

The tire pattern shaping portion 40 is a surface that directly faces the crown region C1 of the tire T to be cured. The tire pattern shaping portion 40 has a pattern shaping surface 42 that shapes a predetermined tread pattern on the circumferential surface (tread surface) of the crown region C1 and end-side joint surfaces 43, 43 each extending outward from the both ends in the width direction of the pattern shaping surface 42.

As shown particularly in FIG. 2, the pattern shaping surface 42 is curved at predetermined curvatures in the circumferential direction and width direction in such a manner that it surrounds the circumferential surface of the crown region C1. Also, the pattern shaping surface 42 has groove shaping parts such as a plurality of main groove shaping ribs 42A, which protrude radially inward and continuously extend circumferentially in the middle region thereof in the width direction, and a plurality of lateral groove shaping ribs 42B, which protrude radially inward and extend outwardly in the width direction from the main groove shaping rib 42A side.

Thus, a tread pattern including the ground contact surfaces and grooves having the inverted shape of the shape of the pattern shaping surface 42 is formed on the circumferential surface of the crown region C1 of the tire T that contacts in the pressed state with the pattern shaping surface 42.

It is to be noted, however, that the shape of the pattern shaping surface 42 as illustrated is only an example. The shape, number, and arrangement of the plurality of main groove shaping ribs 42A, 42B or the lateral groove shaping ribs 43A, 43B may be change or the blades capable of forming narrow grooves, such as sipes, may be embedded, for instance. In this manner, various changes may be made as appropriate in accordance with desired tread patterns.

The end-side joint surfaces 43, 43 are each bent outwardly in the width direction from the pattern shaping surface 42 and curved circumferentially at approximately the same curvature as that of the above-described end-side joint surfaces 33, 33 located on the opposite side thereof. As shown in FIG. 1, the end-side joint surfaces 43, 43 are the surfaces that come in close contact with the circumferential surface 2B of the lower-side mold 2 and the circumferential surface 3B of the upper side mold 3, respectively, when the plurality of sector molds 4 are disposed along the circumference direction of the tire T. Also, the end-side joint surfaces 43, 43 have a plurality of bolt holes 44 reaching the side of the above-mentioned end-side joint surfaces 33, 33. The respective bolt holes 44 are opened in positions corresponding to the bolt holes 23A of the base mold 20 when the pattern mold 30 is assembled on the base mold 20.

Now, a description is given of the thickness of the pattern mold 30 to be produced by rapid prototyping. As illustrated in the figures, the radial thickness of the pattern mold 30 is formed thinner than the thickness of the base mold 20.

More specifically, the thickness D1 of the pattern mold 20 between the pattern shaping surface 42 and the pattern-side joint surface 32 is set at about 3 mm, whereas the thickness D2 of the end portions in the width direction between the end-side joint surface 43 and the end-side joint surface 33 is set at about 10 mm.

In this manner, by setting the thickness D1 between the pattern shaping surface 42 and the pattern-side joint surface 32 thinner, the cost can be reduced when compared with the fabrication of the whole sector mold 4 by rapid prototyping. Furthermore, even when deformation has occurred to the pattern mold 30 due to thermal strain, it is easier to correct the deformation when assembled on the base mold 20.

Also, by setting the thickness D2 of the outward portions in the width direction thicker than the thickness D1, it is possible to secure the mechanical strength of the portions coming in contact with the circumferential surface 2A of the lower-side mold 2 and the circumferential surface 3A of the upper-side mold 3. Thus, a pattern mold 30 that can withstand repeated use can be obtained.

It is to be noted that the thickness D1 is not limited to 3 mm. Rather, the choice of any other thickness is acceptable as long as the deformation, if any, can be corrected when the pattern mold 30 is assembled on the base mold 20.

Next, a detailed description is given of the method of assembling together the base mold 20 and the pattern mold 30, which constitute the sector mold 4. The joint portion 35 of the pattern mold 30 as the pattern shaping segment is first brought to face the joint portion 25 of the base mold 20 as the base segment, so that the pattern mold 30 is placed on the base mold 20. Then the plurality of bolt holes 23A opened in the base mold 20 and the plurality of bolt holes 44 opened in the pattern mold 30 are aligned with each other. Then the not-shown bolts are screwed in from the bolt holes 44 into the bolt holes 23A, thereby fastening the base mold 20 and the pattern mold 30 together into a unified body.

In the process of the pattern mold 30 being fastened to the base mold 20, the shape of the pattern mold 30 formed thin is corrected as the joint portion 35 and the pattern shaping surface 42 are extended wider in the width direction and circumferential direction along the joint portion 25 of the base mold 20. That is, the pattern mold 30 produced by rapid prototyping tends to warp inwardly in the width direction and the circumferential direction due to thermal strain occurring during the fabrication. Therefore, the shape immediately after the fabrication has a shape slightly different from the shape of the pattern-side mold model M3.

Therefore, in the producing process of the sector mold 4 according to the present embodiment, by placing and assembling the pattern mold 30 of thin thickness having deformation due to thermal strain on the base mold 20 having a precisely formed joint portion 25, the deformation having occurred in the pattern mold 30 is corrected. With the correction of the deformation of the pattern mold 30, the joint portion 25 and the joint portion 35 are held in close contact with each other whereby the inhibition of thermal conduction at the boundary is reduced. Also, the shape of the pattern shaping surface 42 that defines the shape of the tread pattern of the tire T is in agreement with the design shape of the pattern shaping surface MP of the pattern-side mold model M3. Therefore, it is possible to obtain a sector mold 4 capable of precisely producing a tire T having a tread pattern true to the design.

As have been described thus far, according to the method for producing a sector mold 4 in the present embodiment, the base mold 20 is produced precisely by machining or the like in accordance with the base-side mold model M2, which is a division of the mold model M1. And the pattern mold 30 is produced by rapid prototyping in accordance with the pattern-side mold model M3 such that the pattern mold 30 is of thin thickness but at least includes the pattern shaping surface 42. Then the base mold 20 and the pattern mold 30 are assembled together into a unified body while the deformation in the pattern mold 30 is corrected. Therefore, compared with a case in which the whole sector mold 4 is produced by die-casting, it is possible to obtain the sector mold 4 with high durability and high precision having the pattern shaping surface 42 true to the mold model M1. As a result, the number of processes in the manufacture can be reduced substantially. Also, compared with a case in which the whole sector mold 4 is produced by rapid prototyping, the cost of manufacture can be reduced markedly because of reduced volume. Also, the pattern mold 30 produced by rapid prototyping is thin enough to allow correction of deformation. Accordingly, the deformation resulting from thermal strain during the rapid prototyping can be corrected in the process of fastening to the base mold 20.

Moreover, the base mold 20 and the pattern mold 30 are produced in accordance with the base-side mold model M2 and the pattern-side mold model M3, respectively, divided by the shared virtual division line L1 from the mold model M1. Thus it is possible to easily produce tires T with different tread patterns simply by replacing the pattern mold 30 only.

In other words, the same base mold 20 can be used for different types of tire T, and this can substantially reduce the cost of producing the sector mold 4.

Figure 11:
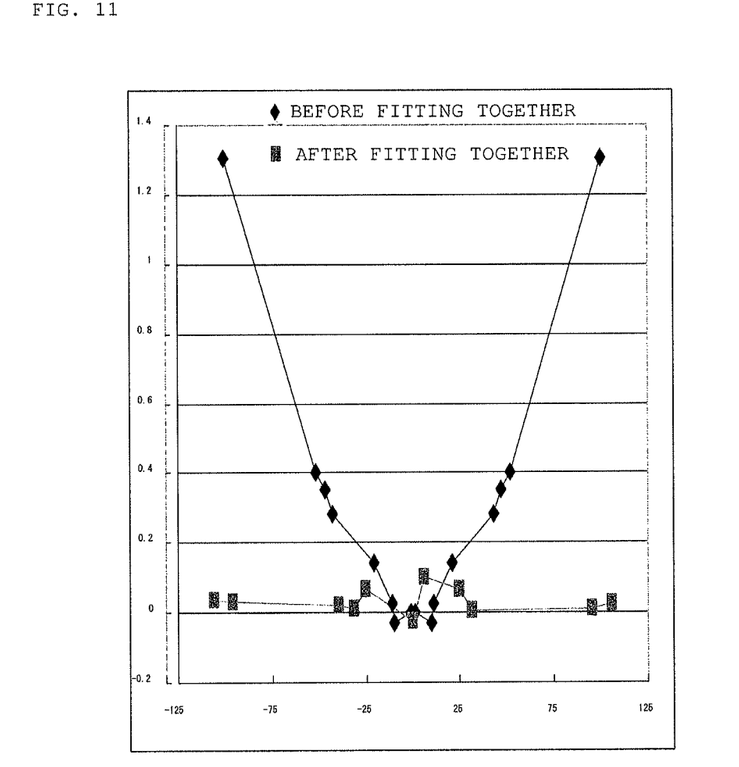
FIG. 11 is a graph showing the measurements of width deformation in the width direction of a pattern mold.

FIG. 11 is a graph showing the measurements of the deformation of the pattern mold 30 in the width direction before and after it is assembled on the base mold 20. As illustrated in the figure, the dislocation of the pattern mold 30 before it is assembled from the shape of the pattern-side mold model M3 is a maximum of 1.3 mm over the whole width direction range. In contrast, the dislocation of the pattern mold 30 after it is assembled is seen converging on as little as 0.1 mm or less over the whole width direction range.

As is clear from the above results, according to the method of producing in the present embodiment, in which the pattern mold 30 of thin thickness produced by rapid prototyping, which is liable to be deformed due to thermal strain, is assembled on the separately produced base mold 20, it is possible to produce at low cost the mold featuring high durability and excellent precision comparable to when the whole mold is produced by casting. In regard to the embodiment thus far explained, a description has been given of the producing processes of the sector mold 4. It is to be noted, however, that the same producing method can be applied just as well to the fabrication of the lower-side mold 2 and the upper-side mold 3 or other mold segments to be disposed in the vulcanizing apparatus 1.

Hereinbelow, a description is given of variations of the structure of the sector mold 4 in the foregoing embodiment and the method for producing the sector mold 4. In the following description, the same components as those in the embodiment thus far described will be denoted with the same reference numerals as those therein, and the description thereof will be omitted.

In fastening the base mold 20 and the pattern mold 30 together, it is preferable that the pattern mold 30 is fastened after a filler material, such as a metal foil (aluminum foil in the present embodiment) or a metal paste, having the same thermal conductivity as the base mold 20 and the pattern mold 30 is laid or applied therebetween.

That is, if the base mold 20 and the pattern mold 30 are fastened together with a filler material intervened, then the minute gaps which may still exist between the joint portion 25 and the joint portion 35 due to insufficient correction can be filled up so that the both can be in close contact with each other, and the thermal conductivity can be improved.

It is to be noted that the metal foil and the filler material whose thermal conductivity is higher than that of the base mold 20 and the pattern mold 30 may be used.

Figure 5:
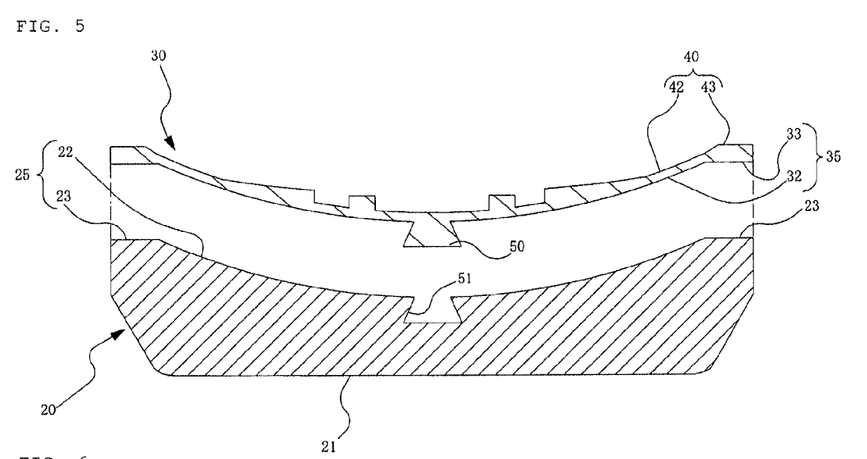
FIG. 5 is a cross-sectional view of a sector mold according to another embodiment.

FIG. 5 illustrates an example where fastening means are provided on the base mold 20 and the pattern mold 30 themselves in the place of the not-shown bolts and bolt holes 23A, 44 which are the means for fastening the base mold 20 and the pattern mold 30 into a unified body. As shown in the figure, the joint portion 35 of the pattern mold 30 in this example is provided with a joint projection 50 protruding toward the joint portion 25 side of the base mold 20. Also, the joint portion 25 of the base mold 20 opposite the joint portion 35 is provided with a joint recess 51 sinking toward the outer periphery 21.

The joint projection 50 has a tapered sectional shape whose width is narrower toward the joint portion 35 and extends all along the circumferential length of the pattern mold 30. Also, the joint recess 51 is tapered in correspondence to the joint projection 50 whose width is narrower toward the joint portion 25 and extends all along the circumferential length of the base mold 20 in the same way as the joint projection 50. Note that the sectional shapes of the joint projection 50 and the joint recess 51 are not limited to tapered shapes, but may be any shape that allows mutual fit.

The unification of the pattern mold 30 and the base mold 20 having the above-described fastening means can be accomplished by inserting circumferential end of the joint projection 50 formed on the pattern mold 30 into a circumferential end of the joint recess 51 formed in the base mold 20 and sliding the joint projection 50 along the interior of the joint recess 51 until the pattern mold 30 is properly positioned circumferentially.

The sector mold 4 according to the present example is such that the joint portion 25 and the joint portion 35 are restricted by the joint projection 50 and the joint recess 51 and thus the shape thereof is corrected. Therefore, without the use of such fastening means as bolts, the base mold 20 and the pattern mold 30 can be unified into a single body easily. Also, if a plurality of the joint projection 50 and the joint recess 51 in this embodiment are formed in the width direction, then the pattern mold 30 can be corrected with greater precision over the whole area thereof, and the contact between the joint portion 25 and the joint portion 35 can be further improved.

Also, it goes without saying that the fastening means in the above example can be used in conjunction with the not-shown bolts and the bolt holes 23A, 44 of the foregoing embodiment. Such combined use may allow more precise correction of the pattern mold 30. It should be noted that the possibility of using the fastening means in conjunction with the not-shown bolts and the bolt holes 23A, 44 applies to the following examples also.

Figure 6:
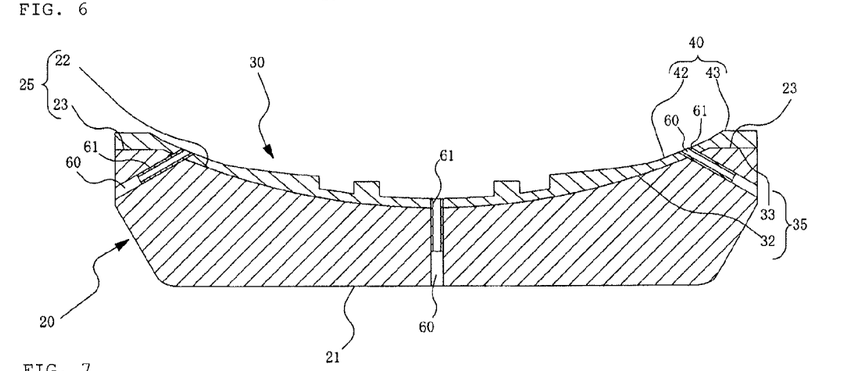
FIG. 6 is a cross-sectional view of a sector mold according to another embodiment.

FIG. 6 shows an example in which a fixing pin 61 is inserted into an air-bleeding hole 60 drilled in the radial direction of the sector mold 4 as a fastening means for unifying the base mold 20 and the pattern mold 30. The air-bleeding hole 60 is a minute through hole leading from the pattern shaping surface 42 to the joint portion 35 of the pattern mold 30 and from the joint portion 25 to the outer periphery 21 of the base old 20. The air-bleeding holes 60 are disposed in a scattered-about manner in the width direction and the circumferential direction of the sector mold 4 and are the flow paths for discharging air remaining between the pattern shaping surface 42 of the pattern mold 30 and the circumferential surface of the crown region C1 of the tire T to the outside.

In the present example, the base mold 20 and the pattern mold 30 are fastened together into a unified body by inserting fixing pins 61, such as radially expandable spring pins, into the air-bleeding holes 60. In this construction, too, the pattern mold 30 can be corrected with great precision over the whole area thereof, and the contact between the joint portion 25 and the joint portion 35 can be further improved.

Figure 7:
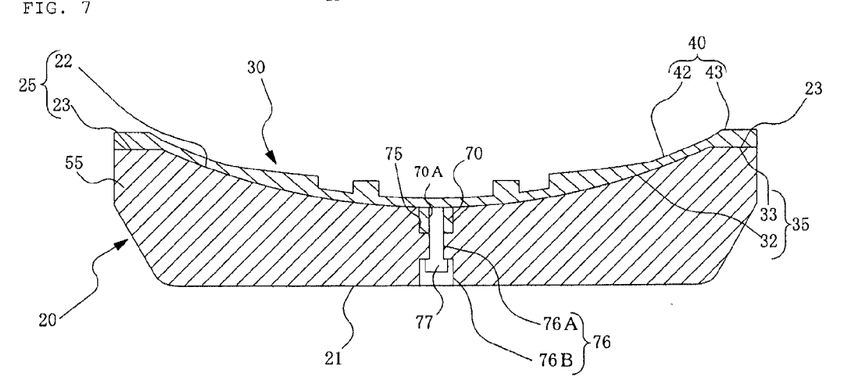
FIG. 7 is a cross-sectional view of a sector mold according to another embodiment.

FIG. 7 shows an example in which a bolt is screwed in from the outer periphery 21 of the base mold 20 as a fastening means for unifying the base mold 20 and the pattern mold 30. As shown in the figure, a bolt receiver 70 protruding toward the joint portion 25 side of the base mold 20 is formed on the joint portion 35 of the pattern mold 30 in this example. Also, formed in the base mold 20 opposite the joint portion 35 are a mating portion 75 of a shape corresponding to the bolt receiver 70 and a bolt insertion hole 76 communicating with the mating portion 75. The bolt receiver 70 is a cylindrical member protruding from the joint portion 35 and has a bolt insertion portion 70A in the center opening toward the lower end thereof. The circumferential surface of the bolt insertion portion 70A has a thread into which the tip portion of the bolt 77 is screwed from the outer periphery 21 side.

The mating portion 75, having a shape corresponding to the shape of the above-mentioned bolt receiver 70, is recessed from the joint portion 25 toward the outer periphery 21. The mating portion 75 fits with the circumferential surface of the bolt receiver 70. The bolt insertion hole 76 leads from the mating portion 75 to the outer periphery 21.

The bolt insertion hole 76 has a threaded portion 76A through which the bolt 77 is screwed and an insertion portion 76B with a larger diameter than the threaded portion 76A. To fasten the pattern mold 30 to the base mold 20 by a fastening means of the structure as described above, the bolt receiver 70 is first positioned and fit into the mating portion 75, and then the bolt 77 is screwed into the bolt insertion hole 76 from the outer periphery 21 side. With the bolt 77 screwed in, the bolt 77 is threadably engaged with the bolt insertion hole 70A and the threaded portion 75B, and the head of the bolt 77 comes to a stop at the upper end of the insertion portion 76B. Thus, the base mold 20 and the pattern mold 30 are securely fastened together into a unified body.

In this example, therefore, the correction is accomplished as the joint portion 35 of the pattern mold 30 placed on the base mold 20 is drawn toward the joint portion 25 side by the bolt 77 screwed in from the outer periphery 21 side. As a result, the shape of the pattern mold 30 can be corrected with precision, and the close contact between the joint portion 25 and the joint portion 35 can be improved.

Also, it goes without saying that the pattern mold 30 can be corrected with greater precision over the whole range if a plurality of this fastening means are formed in the width direction and the circumferential direction of the sector mold 4.

Figure 8:
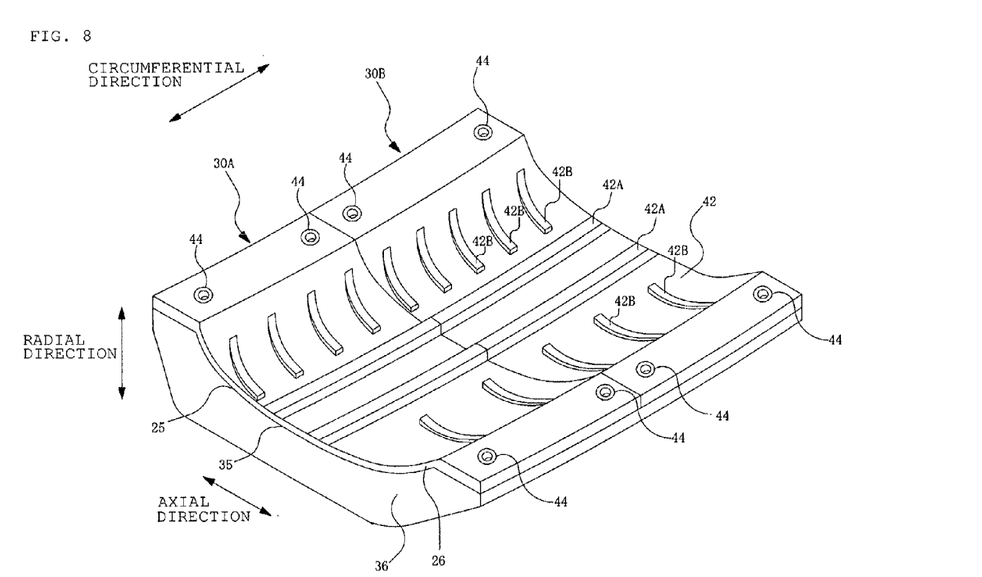
FIG. 8 is an overall perspective view of a sector mold according to another embodiment.

FIG. 8 shows an example in which a plurality of pattern molds 30A, 30B are unified with a base mold 20. The pattern molds 30A, 30B are the circumferentially divided segments of the pattern mold 30 described in the foregoing examples.

It is to be noted that this example shows two circumferentially divided segments, but the number of division is not limited to two.

The base mold 20 and the pattern molds 30A, 30B in this example have not-shown bolt holes 23A and bolt holes 44 in the four corners, respectively. The pattern molds 30A, 30B are fastened by not-shown bolts screwed into the bolt holes 23A and the bolt holes 44.

Regarding the sector mold 4 in this example, the area of the joint portion 35 per unit is smaller than that in the foregoing examples, and the respective pattern molds 30A, 30B are fastened by a plurality of individually provided fastening means. Hence, the shape of the pattern molds 30A, 303 can be corrected more closely, and the close contact between the joint portion 25 and the joint portion 35 can be further improved.

Also, if the circumferentially divided pattern molds 30 are assembled on the base mold 20, the individual pattern molds 30 can be corrected with greater precision. Accordingly, it is possible to obtain a mold featuring uniform thermal conductivity over the whole range.

Figure 9:
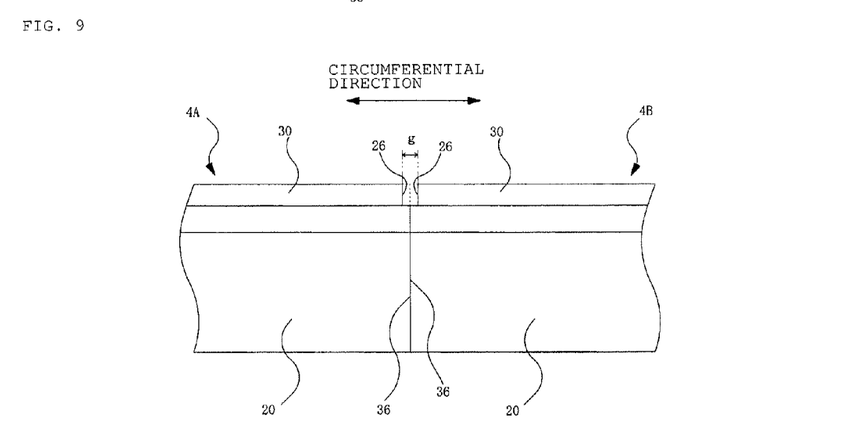
FIG. 9 is a side view of a sector mold according to another embodiment.

FIG. 9 is a side view showing circumferential connection between the sector molds 4 of a structure in the foregoing examples. In this figure, 4A represents a sector mold disposed on one circumferential side, and 4B a sector mold adjacent to the sector mold 4A and disposed on the other circumferential side.

As shown in the figure, the circumferential end faces 26 of the base mold 20 in this example protrude toward the circumferential direction side than the circumferential end faces 36 of the pattern mold 30 fixed thereon. The arrangement is such that the circumferential end faces 36 of the pattern mold 30 are butted against each other when the sector molds 4A, 4B are connected to each other.

In this manner, if the circumferential end faces 36 are butted against each other between the neighboring sector molds 4A, 4B, then a gap g is created between the circumferential end faces 26, 26 of the pattern mold 30 in contrast to the case where the circumferential end faces 26, 36 are in the same plane as in FIG. 2 or in the case where the circumferential end faces 26 only are butted against each other. This prevents the direct contact between the pattern molds 30 formed with thin thickness. And this reduces the possibility of damage to or deformation of the end portions of the pattern molds 30 belonging to the neighboring sector molds 4A, 4B.

DESCRIPTION OF REFERENCE NUMERALS

1 vulcanizing apparatus
2 lower-side mold
3 upper-side mold
4 sector mold
10 bladder
20 base mold
21 outer periphery
22 pattern-side joint surface (base mold)
23 end-side joint surface (base mold)
23A bolt hole
25 joint surface (base mold)
26 circumferential end face
30 pattern mold
32 pattern-side joint surface (pattern mold)
33 end-side joint surface (pattern mold)
35 joint surface (pattern old)
36 circumferential end face (pattern mold)
42 pattern shaping surface 43 end-side joint surface
44 bolt hole
50 joint projection
51 joint recess
60 air-bleeding hole
61 fixing pin
70 bolt receiver
75 mating portion
76 bolt insertion hole
77 bolt

The invention claimed is:

1. A tire vulcanizing mold with a pattern molding segment assembled on a metal base segment, wherein:
   the pattern molding segment is a metal member produced by rapid prototyping based on a shape of a surface layer including a pattern shaping surface of the tire vulcanizing mold and includes joining portions at both end portions,
   the metal base segment is a metal member that includes joining portions at both end portions;
   bolt holes are formed on the joining portions of the pattern molding segment;
   bolt holes are formed on the joining portions of the metal base segment and are opened in positions corresponding to the bolt holes of the pattern molding segment;
   the pattern molding segment and the metal base segment are fastened by screwing bolts into the bolt holes of the pattern molding segment and the bolt holes of the metal base segment; and
   a filler material is intervened between the pattern molding segment and the metal base segment and thermal conductivity of the filler material is higher than that of the metal base segment and the pattern molding segment.

2. The tire vulcanizing mold according to claim 1, wherein:
   a thickness of the pattern molding segment at the pattern shaping surface is thinner than a thickness of the pattern molding segment at the joining portions.

3. The tire vulcanizing mold according to claim 1, wherein:
   a plurality of pattern molding segments are unified with the metal base segment, which includes bolt holes in four corners.

4. The tire vulcanizing mold according to claim 1, wherein:
   a joint projection is formed on a joining side of the pattern molding segment and a joint recess is formed on the metal base segment opposite the joint projection.

5. The tire vulcanizing mold according to claim 4, wherein:
   the joint projection has a tapered sectional shape whose width is narrower toward the joining portions of the pattern molding segment and the joint recess is tapered in correspondence to the joint projection whose width is narrower toward the joining portions of the metal base segment.

6. The tire vulcanizing mold according to claim 4, wherein:
   the joint projection extends all along a circumferential length of the pattern molding segment and the joint recess extends all along a circumferential length of the metal base segment.

7. The tire vulcanizing mold according to claim 1, wherein:
   a bolt receiver, which is a cylindrical member protruding from the joining portions, has a bolt insertion portion in a center opening toward a lower end thereof, and
   a circumferential surface of the bolt insertion portion has a thread into which a tip portion of the bolt is screwed.

8. The tire vulcanizing mold according to claim 7, wherein:
   a mating portion, having a shape corresponding to a shape of the bolt receiver, is recessed from the joining portions outwardly,
   the mating portion fits with a circumferential surface of the bolt receiver, and
   the bolt insertion portion leads from the mating portion to the outer periphery.

9. A tire vulcanizing mold with a pattern molding segment assembled on a metal base segment, wherein:
   the pattern molding segment is a metal member produced by rapid prototyping based on a shape of a surface layer including a pattern shaping surface of the tire vulcanizing mold and includes joining portions at both end portions,
   the metal base segment is a metal member that includes joining portions at both end portions;
   bolt holes are formed on the joining portions of the pattern molding segment;
   bolt holes are formed on the joining portions of the metal base segment and are opened in positions corresponding to the bolt holes of the pattern molding segment;
   the pattern molding segment and the metal base segment are fastened by screwing bolts into the bolt holes of the pattern molding segment and the bolt holes of the metal base segment;
   an air-bleeding hole leading from the pattern shaping surface to the joining portions of the pattern molding segment and from the joining portions to an outer periphery of the metal base segment is formed, and
   the metal base segment and the pattern molding segment are fastened by inserting a fixing pin into the air-bleeding hole.

10. The tire vulcanizing mold according to claim 9, wherein:
    the air-bleeding hole is disposed in a scattered manner in a width direction and a circumferential direction.

* * * * *